(12) United States Patent
Watanabe (10) Patent No.: US 6,628,841 B1
(45) Date of Patent: Sep. 30, 2003

(54) IMAGE SENSING APPARATUS

(75) Inventor: Tohru Watanabe, Ogaki (JP)

(73) Assignee: Sanyo Electric Co., Ltd., Osaka (JP)

(*) Notice: Subject to any disclaimer, the term of this patent is extended or adjusted under 35 U.S.C. 154(b) by 0 days.

(21) Appl. No.: 09/348,424

(22) Filed: Jul. 7, 1999

(30) Foreign Application Priority Data

Jul. 9, 1998 (JP) .......................................... 10-194825

(51) Int. Cl.⁷ .................................................. H04N 9/68
(52) U.S. Cl. ........................................ 382/260; 382/162
(58) Field of Search ................................ 382/260–269, 382/210–211, 162–167; 359/308–314, 502

(56) References Cited

U.S. PATENT DOCUMENTS

| | | | | |
|---|---|---|---|---|
| 4,054,906 A | * | 10/1977 | Yamanaka | .................. 348/264 |
| 5,117,253 A | * | 5/1992 | Suzuki | .................. 355/32 |
| 5,978,023 A | * | 11/1999 | Glenn | .................. 348/234 |

FOREIGN PATENT DOCUMENTS

JP     2000020038 A  *  1/2000  ............ G09G/3/36

* cited by examiner

*Primary Examiner*—Tommy D. Lee
*Assistant Examiner*—Stephen Brinich
(74) *Attorney, Agent, or Firm*—Fish & Richardson P.C.

(57) ABSTRACT

An electronic still camera includes, in addition to a color separation filter, a monochromatic filter which can be moved into or out of a position in from of a solid-state image sensor. The camera includes a processor for generating luminance and chrominance information from image information transferred to it from the image sensor. If the monochromatic filter is in the optical path, the processor generated chrominance information has a predetermined fixed value and the luminance information has a higher resolution than when monochromatic filter is outside of the optical path.

11 Claims, 5 Drawing Sheets

| | Color Separation Filter | Monochromatic Filter |
|---|---|---|
| 1 | Ye, G, Cy, (W) | G |
| 2 | MG, R, Ye, (W) | R |
| 3 | Cy, B, MG, (W) | B |

Color image senesing mode

Fig. 6A

Monochromatic image sensing mode

IMAGE SENSING APPARATUS

BACKGROUND OF THE INVENTION

The present invention relates to an image sensing apparatus, and, more particularly, to an image sensing apparatus which switches between color image sensing and monochromatic image sensing.

An electronic still camera provides computer equipment with the image information of a three-dimensional object. The still camera includes an image sensor, a driver for the image sensor, and a signal processing circuit which generates an electrical signal of the object image in one screen picked up by the image sensor.

Figure 1:
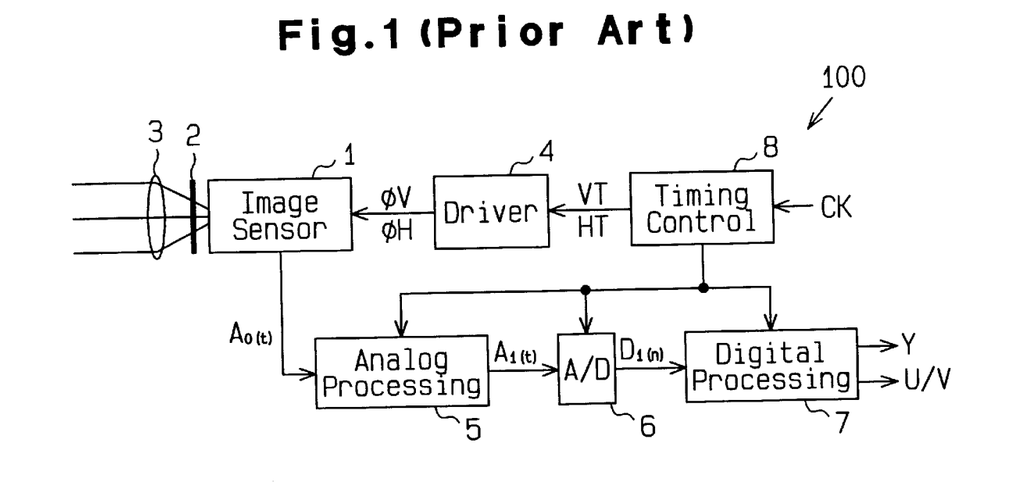
FIG. 1 is a schematic block diagram of a conventional image sensing apparatus.
Figure 2:
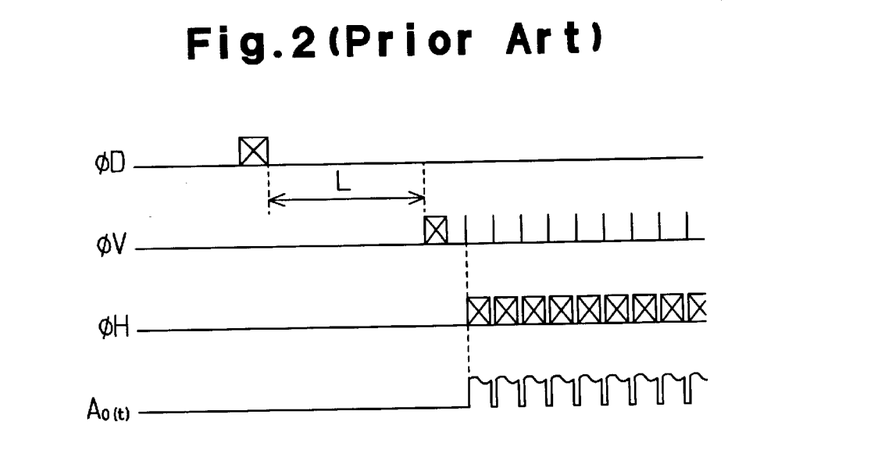
FIG. 2 is a timing diagram for describing the operation of the image sensing apparatus of FIG. 1.

FIG. 1 is a schematic block diagram of a conventional electronic still camera 100, and FIG. 2 is a timing diagram for describing the operation of the camera 100 of FIG. 1. The still camera 100 includes an image sensor 1, a color separation filter 2, a lens 3, a driver 4, an analog processing circuit 5, an A/D convertor 6 and a digital processing circuit 7.

The image sensor 1 is preferably a charge-coupled device (CCD) image sensor and includes a plurality of light receiving pixels (picture elements), which are arranged in a matrix and accumulate an information charge by photoelectric conversion, and a plurality of shift registers which transfer the information charge accumulated in each light receiving pixel in a predetermined order. A plurality of the shift registers includes a plurality of vertical shift registers, which transfer the information charge in each column of the light receiving pixel, and a horizontal shift register which transfers the output of a plurality of the vertical shift registers. The color separation filter 2 has a plurality of segments mounted on the light receiving surface of the image sensor 1. The plurality of segments are formed by the three primary colors of light or their complementary color elements arranged in accordance with a predetermined rule. By using the color separation filter 2, each light receiving pixel is associated with a specific color component. The color separation filter 2 may also be formed as an on-chip filter by laminating a layer on the semiconductor image sensor 1. The lens 3 is arranged on the color separation filter 2 and guides the light from an object to the light receiving surface of the image sensor 1 via the color separation filter 2.

The driver 4 generates a vertical transfer clock $\phi V$, a horizontal transfer clock $\phi H$ and a discharge clock $\phi D$ for pulse-driving the image sensor 1 in accordance with an instruction from a timing control circuit 8. As shown in FIG. 2, after the information charge of the light receiving pixel is fully discharged in accordance with the discharge clock $\phi D$ and a predetermined period L elapses, the information charge is transferred from each light receiving pixel to the corresponding vertical shift register in accordance with the vertical transfer clock $\phi V$. At this time, the information charge is transferred to the vertical direction in a unit of one line by a vertical shift register. The information charge from a vertical register is transferred to the horizontal direction every pixel by a horizontal shift register in accordance with the horizontal transfer clock $\phi H$. Thus the image information of one screen is successively output from the image sensor 1 in a unit of one line as an image signal A0(t).

The analog processing circuit 5 receives the image signal A0(t) from the image sensor 1, performs processing such as sample holding and level correction on an image signal, and generates a formatted analog image signal A1(t). The A/D convertor 6 receives an analog image signal A1(t) from the analog processing circuit 5 and converts the analog image signal A1(t) to digital image data D1(n) every pixel. The digital processing circuit 7 receives the digital image data D1(n) from the A/D convertor 6, performs processing such as color separation and matrix operation on the digital image data D1(n), and generates luminance data Y which represents luminance information and two types of chrominance data U and V which represent the chrominance information. The luminance data Y and the chrominance data U and V are transferred to a computer in units of one screen.

For example, the luminance data Y is generated by combining the three primary colors (red: R, green: G, and blue: B) of light generated by color separation at a ratio of 0.3 R+0.6 G+0.1 B. The chrominance data U and V are generated by subtracting the red component R and the blue component B from the luminance data Y.

The timing control circuit 8 controls each of the circuits 4 to 7 in accordance with a reference clock CK. For example, the timing control circuit 8 controls the driver 4 such that an accumulation time L of the information charge is set in accordance with the exposed state of the image sensor 1 and an image signal A0(t) having an appropriate level can be obtained. Further, the timing control circuit 8 sets the processing conditions of the analog and digital processing circuits 5 and 7 so that the processing of the analog and digital processing circuits 5 and 7 is synchronized with the operation of the image sensor 1.

The image information supplied to the computer also includes a monochromatic image of a document on which characters are written and graphics are drawn. Accordingly, it is preferable that an electronic still camera be provided with a color image sensing mode in which an object is photographed, and a monochromatic image sensing mode which generates an image representing only the light and shade of the object. The image sensing mode can be switched by changing the arithmetic operation processing of the digital processing circuit 7. The monochromatic image sensing mode is effective for improving resolution to preferentially process the luminance information. However, to obtain high resolution based on the image signal D1(t) generated using the color separation filter 2, complicated filtering processing must be performed on the separated color component data, which makes the circuit configuration of the digital processing circuit 7 complex.

SUMMARY OF THE INVENTION

It is an object of the present invention to provide an image sensing apparatus which switches between color image sensing and monochromatic image sensing without making the configuration of a digital processing circuit complex.

In one aspect of the present invention, an image sensing apparatus is provided that includes a solid-state image sensor having a plurality of light receiving elements which accumulate an information charge by photoelectric conversion. A color separation filter is arranged in front of the solid-state image sensor and has a plurality of filter segment groups. Each filter segment group corresponds to each of the plurality of light receiving elements, respectively and includes a first color filter segment having a first color selected from the three primary colors of light and second and third color filter segments having the complementary colors of the non-selected two of the three primary colors. A monochromatic filter is movably arranged between a position in an optical path to the plurality of light receiving elements and a position away from the optical path to the plurality of light receiving elements. The monochromatic filter has substantially the same first color as the first color filter segment. A driver transfers the information charge accumulated by the plurality of the light receiving elements in a predetermined order and drives the solid-state image sensor so as to output an image signal therefrom.

In another aspect of the present invention, an electronic camera is provided that includes an image sensor including a plurality of light receiving pixels that receive light irradiated on a surface of the image sensor. The image sensor accumulates an information charge by photoelectric conversion of the received light. A color separation filter is arranges adjacent to the image sensor. The color separation filter has a plurality of segments formed by at least three color components of light, such that each light receiving pixel is associated with a specific one of the at least three colors. A lens is arranged adjacent to the color separation filter for guiding light from an object to the image sensor by way of the color separation filter. The guided light travels along an optical path extending from beyond the lens to the image sensor. A monochromatic filter is located in the optical path. The monochromatic filter limits color components of the light irradiated on the image sensor. A combination of the color components of the color separation filter and the monochromatic filter is selected such that the color component passed by the monochromatic filter is also passed by the color separation filter. A signal processing circuit receives the information charge and generates luminance data and chrominance data. The processing circuit is operable in either a color image sensing mode or a monochrome image sensing mode.

Other aspects and advantages of the invention will become apparent from the following description, taken in conjunction with accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

In the drawings, like numerals are used for like elements throughout.

Figure 3:
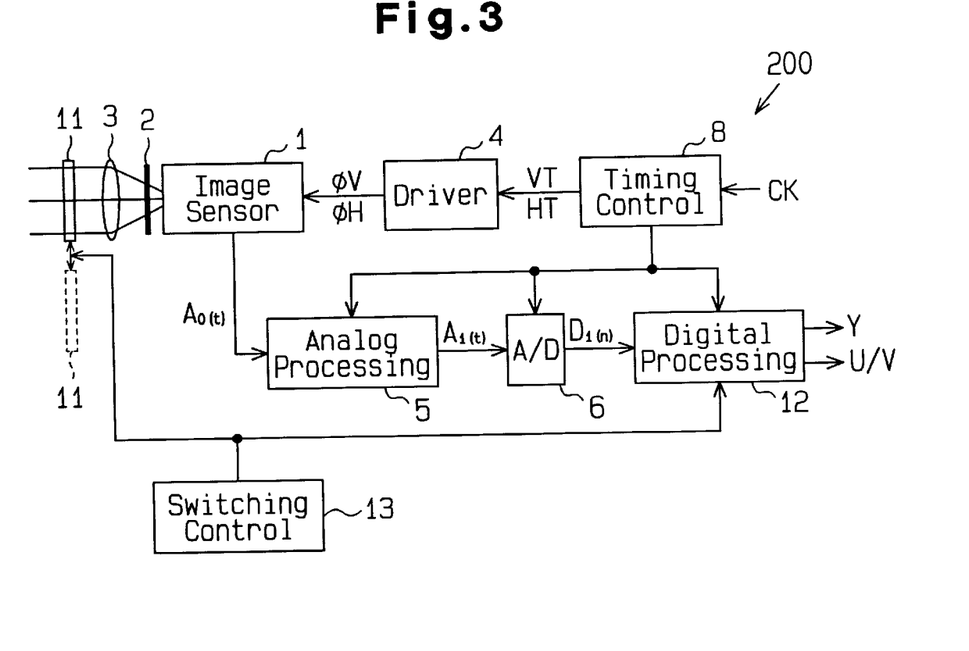
FIG. 3 is a schematic block diagram of an image sensing apparatus according to one embodiment of the present invention.

FIG. 3 is a schematic block diagram of an image sensing apparatus 200 according to one embodiment of the present invention. The image sensing apparatus 200 includes the image sensor 1, the color separation filter 2, the lens 3, the driver 4, the analog processing circuit 5, the A/D convertor 6, the timing control circuit 8, a monochromatic filter 11, a digital processing circuit 12 and a switching control circuit 13.

In one embodiment of the present invention, the monochromatic filter 11 is removably arranged from the optical path of the image sensor 1, and the mounting of the monochromatic filter 11 and the selection of the processing of the digital processing circuit 12 are performed by the switching control circuit 13.

The monochromatic filter 11 is mounted on a detachable device (not illustrated) which moves the monochromatic filter 11 between a position in the optical path of light irradiated on the image sensor 1 via the lens 3 and a position away from or outside of the optical path. That is, the monochromatic filter 11 is movably provided in front of the lens 3. The monochromatic filter 11 limits color components of the light irradiated to the light receiving surface of the image sensor 1 via the color separation filter 2. Accordingly, a combination of the color components of the color separation filter 2 is selected so that the specific color component limited by the monochromatic filter 11 is transmitted.

The digital processing circuit 12 switches between a color image sensing mode and a monochromatic image sensing mode in accordance with an instruction of the switching control circuit 13. In the color image sensing mode, the digital processing circuit 12 performs processing such as color separation and matrix operation on the image data D1(n) from the A/D convertor 6 and generates the luminance data Y and the chrominance data U and V. The luminance data Y and the chrominance data U and V are generated in the same manner as the digital processing circuit 7 of FIG. 1. In the monochromatic image sensing mode, the digital processing circuit 12 performs processing such as gamma correction and contour correction on the image data D1(n) and generates the luminance data Y. Accordingly, the digital processing circuit 12 does not perform color separation in the monochromatic image sensing mode. The digital processing circuit 12 also outputs the chrominance data U and V having a fixed value "0".

The switching control circuit 13 instructs the attachment and detachment of the monochromatic filter 11, selects the processing of the digital processing circuit 12, and switches between the color image sensing mode and the monochromatic image sensing mode. In the color image sensing mode, the switching control circuit 13 controls the detachable device and the digital processing circuit 12 so that the monochromatic filter 11 is detached, light is incident on the image sensor 1 via the color separation filter 2, and the digital processing circuit 12 performs the processing for color image sensing. In the monochromatic image sensing mode, the switching control circuit 13 controls the detachable device and the digital processing circuit 12 so that the monochromatic filter 11 is mounted, light having specific color components is incident on the image sensor 1, and the digital processing circuit 12 performs the processing which corresponds to the monochromatic image sensing. Accordingly, the color image sensing mode and the monochromatic image sensing mode are easily switched by attachment and detachment of the monochromatic filter 11 and the selection of the processing of the digital processing circuit 12.

Figure 4:
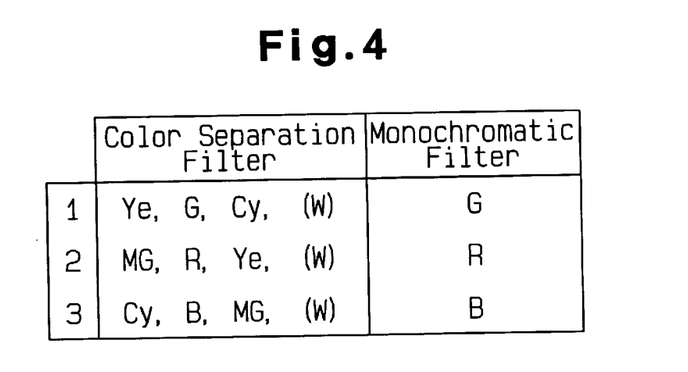
FIG. 4 is a diagram showing variations of a combination of color components in the color separation filter and the monochromatic filter of the image sensing apparatus of FIG. 3.

FIG. 4 is a diagram showing variations of a combination of the color components of the color separation filter 2 and the monochromatic filter 1. One color selected from the three primary colors (R, G, and B) of light and the two complementary colors which correspond to the remaining two of the three primary colors except the selected color are selected for the color separation filter 2. One color among the three primary colors used in the color separation filter 2 is selected for the monochromatic filter 11. W (white) may also be added to a combination of any colors of the color separation filter 2. This is because W (white) transmits all color components.

Figure 5A:
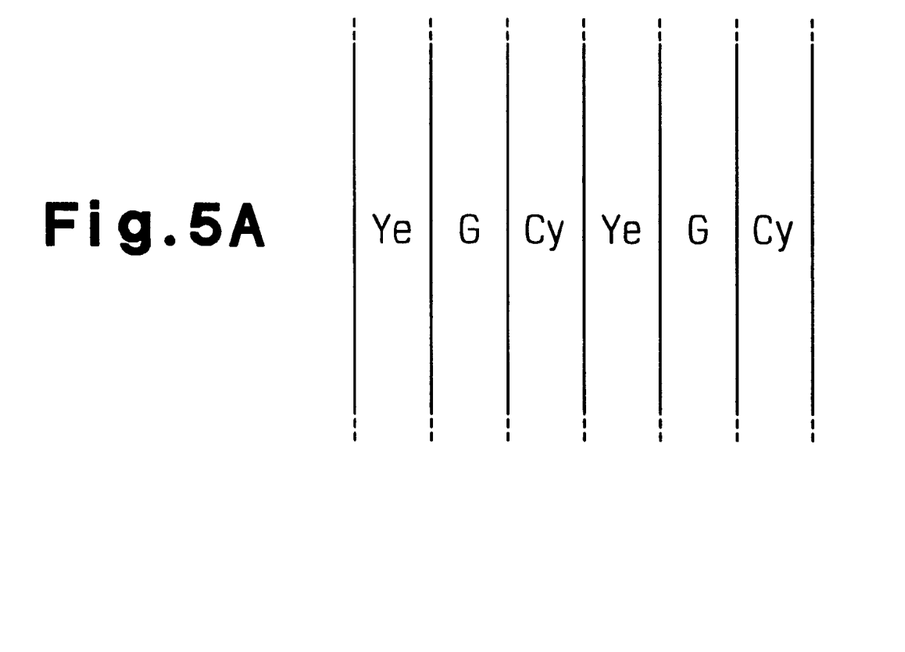
FIGS. 5A and 5B are schematic plan views showing examples of the color separation filter of the image sensing apparatus of FIG. 3.
Figure 5B:
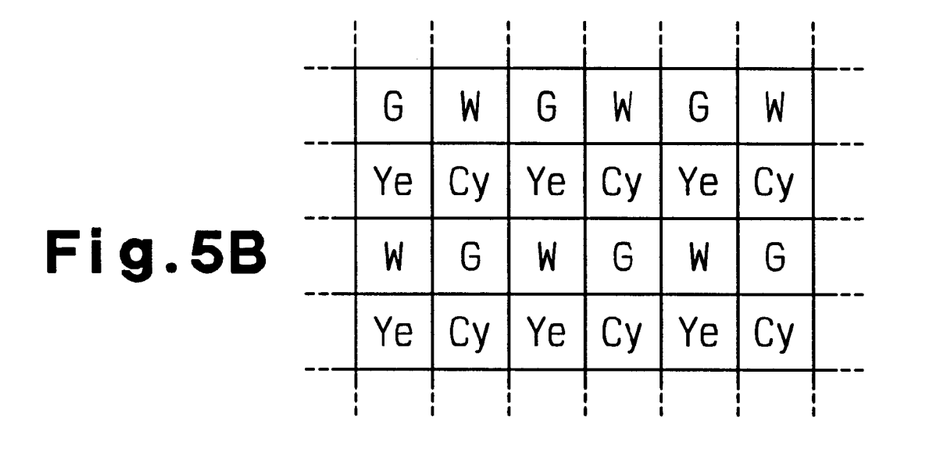

FIG. 5A shows the stripe type color separation filter 2. In this case, for example, Ye (yellow), G (green), and Cy (cyan) are repeatedly arranged in a predetermined order. FIG. 5B shows the mosaic type color separation filter. In this case, for example, W (white) and G are alternately arranged in an odd line, and Ye and Cy are alternately arranged in an even line.

Figure 6A:
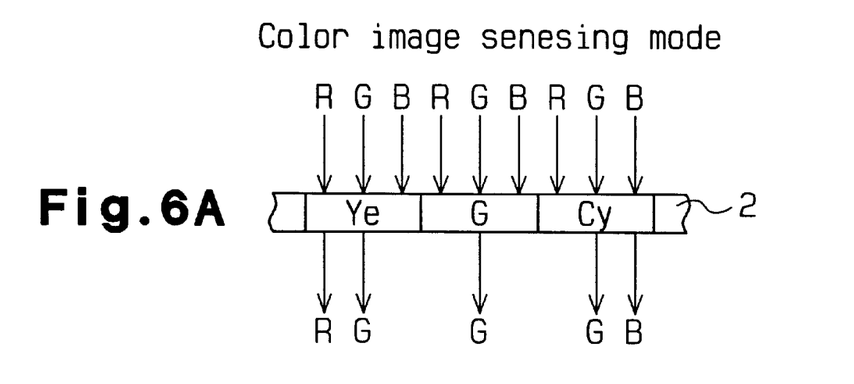
FIG. 6A is a diagram showing color components which pass through a color separation filter in a color image sensing mode.
Figure 7A:
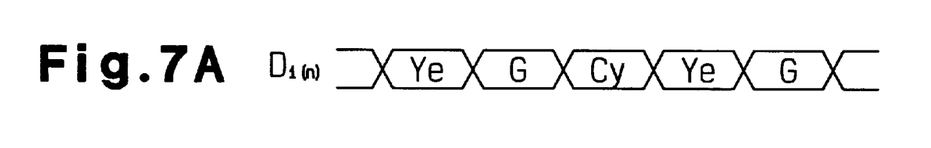
FIG. 7A is a diagram showing color components of image data in a color image sensing mode.

FIG. 6A is a diagram showing color components which pass through a color separation filter in the color image sensing mode. FIG. 7A is a diagram showing color components of the image data D1(n) in color image sensing mode. Hereupon, the stripe type color separation filter 2 of FIG. 5A is used.

In the color image sensing mode, as shown in FIG. 6A, only the color separation filter 2 is arranged in the optical path to the image sensor 1. If the three primary colors (R, G, and B) of light are incident on each segment of the color separation filter 2, a Ye filter segment allows the transmission of the R component and G component, a G filter segment allows the transmission of only the G component, and a Cy filter segment allows the transmission of the G component and B component. Thus R+G (Ye) and G and G+B (Cy) are incident on each light receiving pixel of the image sensor 1. As a result, as shown in FIG. 7A, the image data D1(n) in which R+G (Ye) and G and G+B (Cy) are repeated in a unit of one pixel is generated. The digital processing circuit 12 generates the R component by subtracting the G component from the Ye component and generates the B component by subtracting the G component from the Cy component. The digital processing circuit 12 performs processing such as chrominance operation and generates the luminance data Y and the chrominance data U and V using the R, B and G components.

Figure 6B:
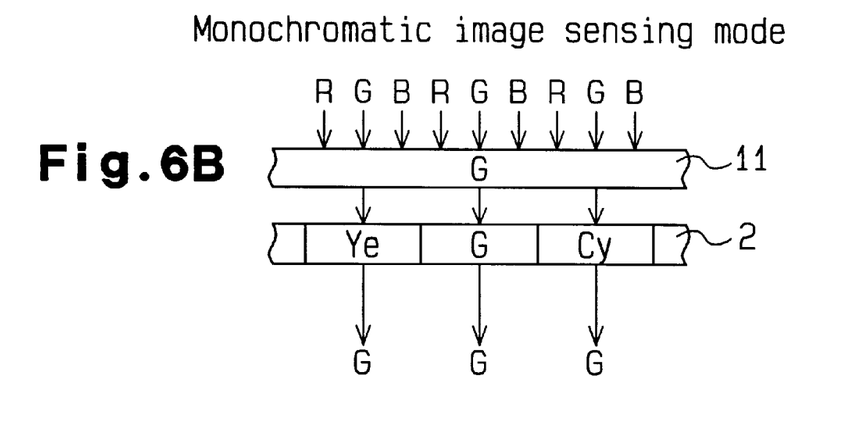
FIG. 6B is a diagram of color components which pass through a monochromatic filter in a monochromatic image sensing mode.
Figure 7B:
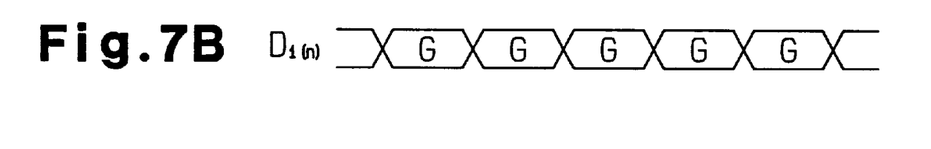
FIG. 7B is a diagram showing color components of image data in a monochromatic image sensing mode.

FIG. 6B is a diagram showing color components which pass through a monochromatic filter in the monochromatic image sensing mode. FIG. 7B is a diagram showing the color components of image data D1(n) in the monochromatic image sensing mode.

In the monochromatic image sensing mode, as shown in FIG. 6B, the color separation filter 2 and the monochromatic filter 11 are both arranged in the optical path to the image sensor 1. At this time, the monochromatic filter 11 allows the transmission of only the G component, so the G component is incident on each segment of the color separation filter 2. The Ye, G and Cy filter segments of the color separation filter 2 allow the transmission of the G component. Thus only the G component is incident on each light receiving pixel of the image sensor 1, and the image data D1(n) in which only the G component continues is generated as shown in FIG. 7B. The digital processing circuit 12 performs processing such as gamma correction and contour correction on the image data D1(n) and generates the luminance data Y without performing color separation on the image data D1(n).

Figure 8:
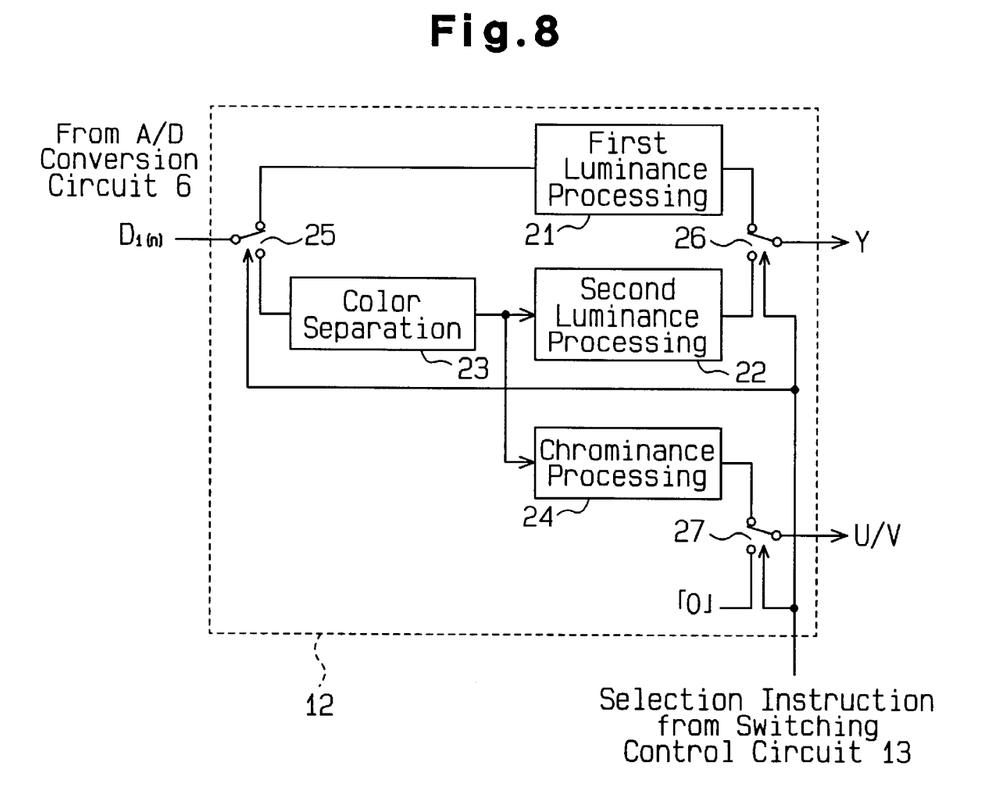
FIG. 8 is a schematic block diagram of a digital processing circuit of the image sensing apparatus of FIG. 3.

FIG. 8 is a schematic block diagram of a preferred implementation of the digital processing circuit 12. The digital processing circuit 12 includes a first luminance processing circuit 21, a second luminance processing circuit 22, a color separation circuit 23, a chrominance processing circuit 24 and first to third changeover switches 25 to 27.

The first changeover switch 25 is connected to the A/D converter 6 and receives image data D1(n), and supplies the image data D1(n) to the first luminance processing circuit 21 or the color separation circuit 23 in response to an instruction from the switching control circuit 13.

The first luminance processing circuit 21 performs processing such as gamma correction and contour correction on the image data D1(n) representing a monochromatic image regardless of color components and generates the luminance data Y. Since the luminance data Y is generated based on the image data D1(n) representing a monochromatic image (for example, G component), the resolution of the luminance data Y is relatively high.

The color separation circuit 23 separates the image data D1(n) into each of the color components and generates color component data. For example, three types of color component data which correspond to Ye, G, and Cy components are generated by allocating the image data D1(n) of FIG. 7A to three color components in a unit of one pixel.

The second luminance processing circuit 22 receives the color component data from the color separation circuit 23, performs predetermined filtering processing on the color component data, and generates the luminance data Y. For example, the luminance data Y may be generated by uniformly combining the Ye, G, and Cy components.

The chrominance processing circuit 24 also receives the color component data from the color separation circuit 23, performs chrominance matrix processing on the color component data, and generates the chrominance data U and V based on the R, G, and B components. For example, the R component may be generated by subtracting the G component from the Ye component, and the B component may be generated by subtracting the G component from the Cy component.

The second changeover switch 26 is connected to the first and second luminance processing circuits 21 and 22 and outputs the luminance data Y of the first or second luminance processing circuit 21 or 22 in accordance with an instruction from the switching control circuit 13.

The third changeover switch 27 is connected to the chrominance processing circuit 24 and a terminal for supplying the fixed data "0" and outputs the chrominance data U and V or the fixed data "0" of the chrominance processing circuit 24 in accordance with an instruction from the switching control circuit 13.

When an instruction specifying the color image sensing mode is issued by the switching control circuit 13, the first changeover switch 25 selects the color separation circuit 23, the second changeover switch 26 selects the second luminance processing circuit 22, and the third changeover switch 27 selects the chrominance processing circuit 24. Thus the luminance data Y and the chrominance data U and V for color image display are obtained from the image data D1(n) supplied from the A/D convertor 6.

When an instruction specifying the monochromatic image sensing mode is issued by the switching control circuit 13, the first changeover switch 25 selects the first luminance processing circuit 21, the second changeover switch 26 selects the first luminance processing circuit 21, and the third changeover switch 27 selects the terminal of the fixed data "0". Thus the luminance data Y for displaying a monochromatic image is obtained from the image data D1(n) supplied from the A/D convertor 6. At this time, the luminance data Y has high resolution and the chrominance data U and V are fixed to "0".

In the digital processing circuit 12, since the first luminance processing circuit 21 ignores color components and performs processing on the image data D1(n), an image having high resolution is obtained using a simple circuit configuration.

It should be apparent to those skilled in the art that the present invention may be embodied in many other specific forms without departing from the spirit or scope of the invention. Therefore, the present examples and embodiment are to be considered as illustrative and not restrictive and the invention is not to be limited to the details given herein, but may be modified within the scope and equivalence of the appended claims.

What is claimed is:

1. An image sensing apparatus, comprising:
    a solid-state image sensor having a plurality of light receiving elements which accumulate an information charge by photoelectric conversion;
    a color separation filter arranged in front of the solid-state image sensor and having a plurality of filter segment groups, which include a first color filter segment group having a first color selected from the three primary colors of light and second and third color filter segment groups having the complementary colors of the non-selected two of the three primary colors, wherein each filter segment group includes a plurality of filter segments each of which corresponds to each one of the light receiving elements;
    a monochromatic filter movably arranged between a position in an optical path to the plurality of light receiving elements and a position away from the optical path to the plurality of light receiving elements, wherein the monochromatic filter has substantially the same first color as the first color filter segment; and
    a driver connected to the solid-state image sensor for transferring the information charge accumulated by the plurality of the light receiving elements in a predetermined order and driving the solid-state image sensor so as to output an image signal therefrom.

2. The apparatus of claim 1, further comprising a signal processing circuit receiving the image signal from the solid-state image sensor, performing predetermined signal processing on the image signal, and generating luminance information and chrominance information.

3. The apparatus of claim 2, wherein the signal processing circuit includes:
    a first luminance processing circuit for performing first predetermined processing on the image signal having first color components that passes through the monochromatic filter and the color separation filter and generating a first luminance signal;
    a color separation circuit for separating the image signal having the first, second, and third color components and generating a color component signal;
    a second luminance processing circuit for receiving the color component signal from the color separation circuit, performing second predetermined processing on the color component signal, and generating a second luminance signal; and
    a chrominance processing circuit for receiving the color component signal from the color separation circuit, performing third predetermined processing on the color component signal, and generating a chrominance signal.

4. The apparatus of claim 3, wherein the signal processing circuit outputs the first luminance signal when the monochromatic filter is in the first position, and outputs the second luminance signal and the chrominance signal when the monochromatic filter is in the second position.

5. The apparatus of claim 3, wherein the signal processing circuit selects one of the processing of the first luminance processing circuit and the processing of the second luminance processing circuit and the chrominance processing circuit.

6. The apparatus of claim 3, wherein the signal processing circuit further includes:
    a first switching circuit connected between the first luminance processing circuit and the color separation circuit for selectively supplying the image signal to the first luminance processing circuit and the color separation circuit in accordance with a switching signal;
    a second switching circuit connected between the first and second luminance processing circuits for selectively outputting one of the first and second luminance signals in accordance with the switching signal; and
    a third switching circuit connected between the chrominance processing circuit and a supply terminal of fixed data for selectively outputting one of the chrominance signal and the fixed data in accordance with the switching signal.

7. The apparatus of claim 6, wherein the first color is green, the second color is yellow, and the third color is cyan.

8. The apparatus of claim 6, wherein the first color is red, the second color is magenta, and the third color is yellow.

9. The apparatus of claim 6, wherein the first color is blue, the second color is cyan, and the third color is magenta.

10. An electronic camera, comprising:
    an image sensor including a plurality of light receiving pixels that receive light irradiated on a surface of the image sensor, the image sensor accumulating an information charge by photoelectric conversion of the received light;
    a color separation filter adjacent to the image sensor, the color separation filter having a plurality of segments formed by at least three color components of light, such that each light receiving pixel is associated with a specific one of the at least three colors;
    a lens adjacent to the color separation filter for guiding light from an object to the image sensor by way of the color separation filter, wherein the guided light travels along an optical path extending from beyond the lens to the image sensor;
    a monochromatic filter located in the optical path, the monochromatic filter limiting color components of the light irradiated on the image sensor, wherein a combination of the color components of the color separation filter and the monochromatic filter is selected such that the color component passed by the monochomatic filter is also passed by the color separation filter; and
    a signal processing circuit, connected to the image sensor, for receiving the information charge and generating luminance data and chrominance data, and wherein the processing circuit is operable in either a color image sensing mode or a monochrome image sensing mode.

11. The camera of claim 10, wherein for the at least three color components of the color separation filter, one of the at least three colors is selected from the group of primary colors and the other two of the at least three colors are complementary colors corresponding to the two non-selected primary colors, and wherein the monochomatic filter passes the selected primary color of the color separation filter.

* * * * *